United States Patent
Traverso et al.

(10) Patent No.: US 12,422,624 B2
(45) Date of Patent: Sep. 23, 2025

(54) TUNABLE SILICON NITRIDE WAVEGUIDE STRUCTURE

(71) Applicant: Cisco Technology, Inc., San Jose, CA (US)

(72) Inventors: Matthew J. Traverso, Saratoga, CA (US); Donald J. Adams, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 122 days.

(21) Appl. No.: 18/168,617

(22) Filed: Feb. 14, 2023

(65) Prior Publication Data

US 2024/0272369 A1 Aug. 15, 2024

(51) Int. Cl.
*G02B 6/35* (2006.01)
*G02F 1/225* (2006.01)

(52) U.S. Cl.
CPC ........... *G02B 6/357* (2013.01); *G02B 6/3524* (2013.01); *G02B 6/3584* (2013.01); *G02F 1/2257* (2013.01); *G02F 2203/055* (2013.01)

(58) Field of Classification Search
CPC .... G02B 6/357; G02B 6/3524; G02B 6/3584; G02F 1/2257; G02F 2203/055
See application file for complete search history.

(56) References Cited

U.S. PATENT DOCUMENTS

| | | | |
|---|---|---|---|
| 5,995,688 A | 11/1999 | Aksyuk et al. | |
| 2004/0120638 A1 | 6/2004 | Frick | |
| 2006/0110101 A1 | 5/2006 | Lin et al. | |
| 2007/0134835 A1 * | 6/2007 | Fukuda | H01H 59/0009 438/48 |
| 2014/0192395 A1 | 7/2014 | Kothari | |
| 2016/0266331 A1 | 9/2016 | Hutchison et al. | |
| 2017/0059778 A1 * | 3/2017 | Huang | G02B 6/29382 |

OTHER PUBLICATIONS

Mukesh Kumar et al., "Tunable Hollow Optical Waveguide and It's Application," Intechopen, Dated: Feb. 1, 2010, pp. 1-25.
Warren Jin, Ronald G. Polcawich, Paul A. Morton, and John E. Bowers, "Piezoelectrically tuned silicon nitride ring resonator," Opt. Express 26, 3174-3187 (2018) <https://opg.optica.org/oe/fulltext.cfm?uri=oe-26-3-3174&id=381274>.
Xiaoxiao Xue, Yi Xuan, Cong Wang, Pei-Hsun Wang, Yang Liu, Ben Niu, Daniel E. Leaird, Minghao Qi, and Andrew M. Weiner, "Thermal tuning of Kerr frequency combs in silicon nitride microring resonators," Opt. Express 24, 687-698 (2016) <https://opg.optica.org/oe/fulltext.cfm?uri=oe-24-1-687&id=335412>.
Tormen, Maurizio, et al. "Deformable MEMS grating for wide tunability and high operating speed." Journal of Optics A: Pure and Applied Optics 8.7 (2006): S337. <https://iopscience.iop.org/article/10.1088/1464-4258/8/7/S07/meta>.

(Continued)

*Primary Examiner* — Sung H Pak
(74) *Attorney, Agent, or Firm* — Patterson + Sheridan, LLP

(57) ABSTRACT

Embodiments herein describe using an actuator to tune a waveguide. In one embodiment, the tunable waveguide includes a gap between the waveguide and cladding. The actuator can compress the cladding to shrink this air, bringing the cladding closer to the waveguide. Doing so changes the effective refractive index of the waveguide. Alternatively or additionally, the actuator can increase the gap.

20 Claims, 8 Drawing Sheets

(56) References Cited

OTHER PUBLICATIONS

Zhou, Guangcan, et al. "MEMS gratings and their applications." International Journal of Optomechatronics 15.1 (2021): 61-86. <https://www.tandfonline.com/doi/full/10.1080/15599612.2021.1892248>.

W. Yu et al., "MEMS-Based Tunable Grating Coupler," in IEEE Photonics Technology Letters, vol. 31, No. 2, pp. 161-164, Jan. 15, 15, 2019, doi: 10.1109/LPT.2018.2887254. <https://ieeexplore.ieee.org/abstract/document/8581451> [Abstract Only].

Mingxin Song, Jinghua Yin, Xunjun He and Yue Wang, "Design and analysis of a novel low actuation voltage capacitive RF MEMS switches," 2008 3rd IEEE International Conference on Nano/Mirco Engineered and Molecular Systems, 2008, pp. 235-238, doi: 10.1109/NEMS.2008.4484325.

Stefan Nevlacsil, Moritz Eggeling, Paul Muellner, Guenther Koppitsch, Martin Sagmeister, Jochen Kraft, Rainer Hainberger, "Broadband SiN asymmetric directional coupler for 840 nm operation," OSA Continuum 1, 1324-1331 (2018); https://www.osapublishing.org/osac/abstract.cfm?uri=osac-1-4-1324 <%20%20https:/www.osapublishing.org/osac/abstract.cfm?uri=osac-1-4-1324>.

International Search Report and Written Opinion for International Application No. PCT/US2024/015061, mailed May 27, 2024, 14 Pages.

\* cited by examiner

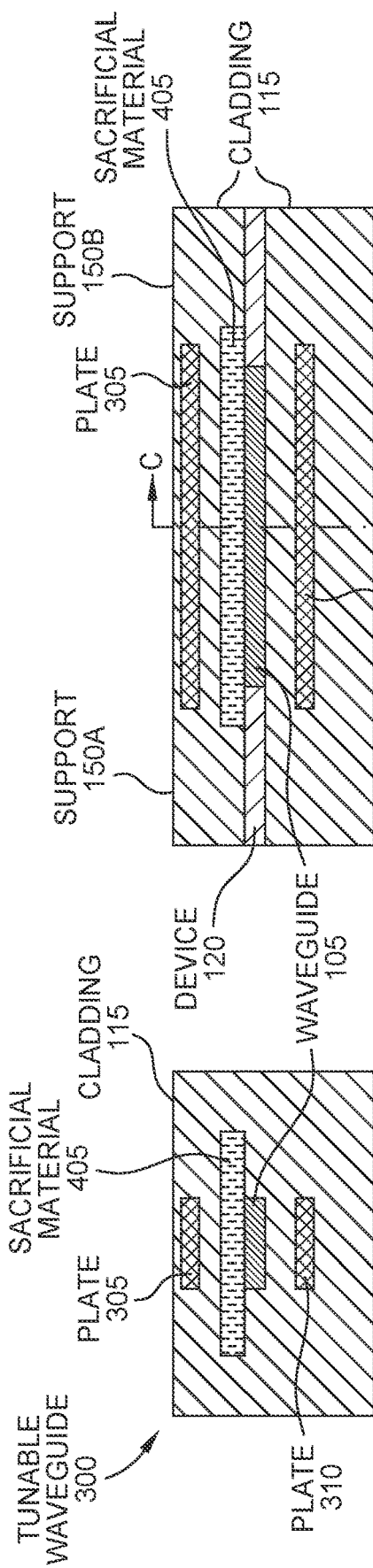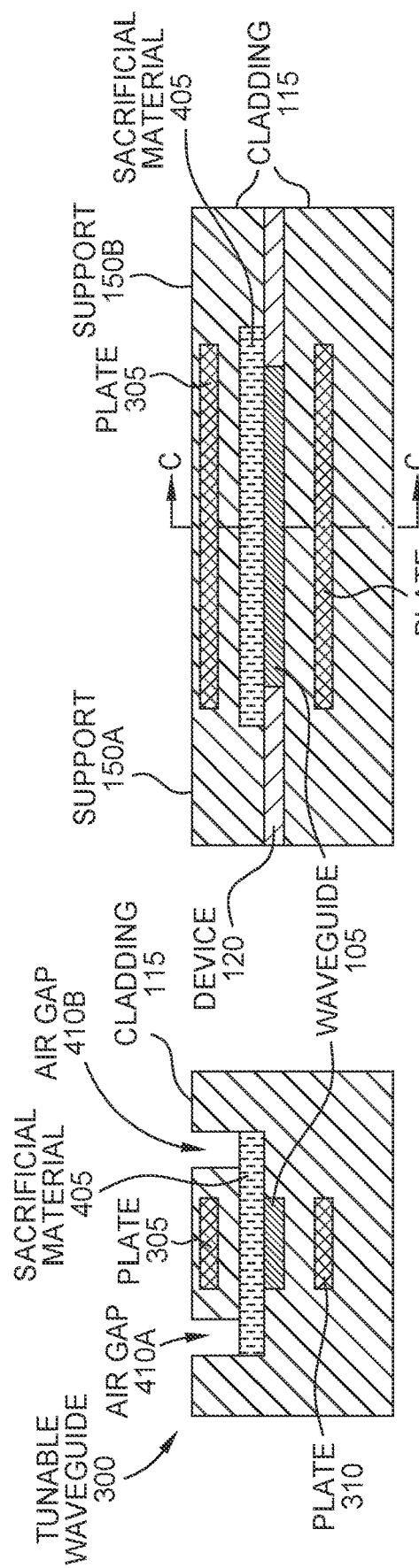
FIG. 5A
FIG. 5B

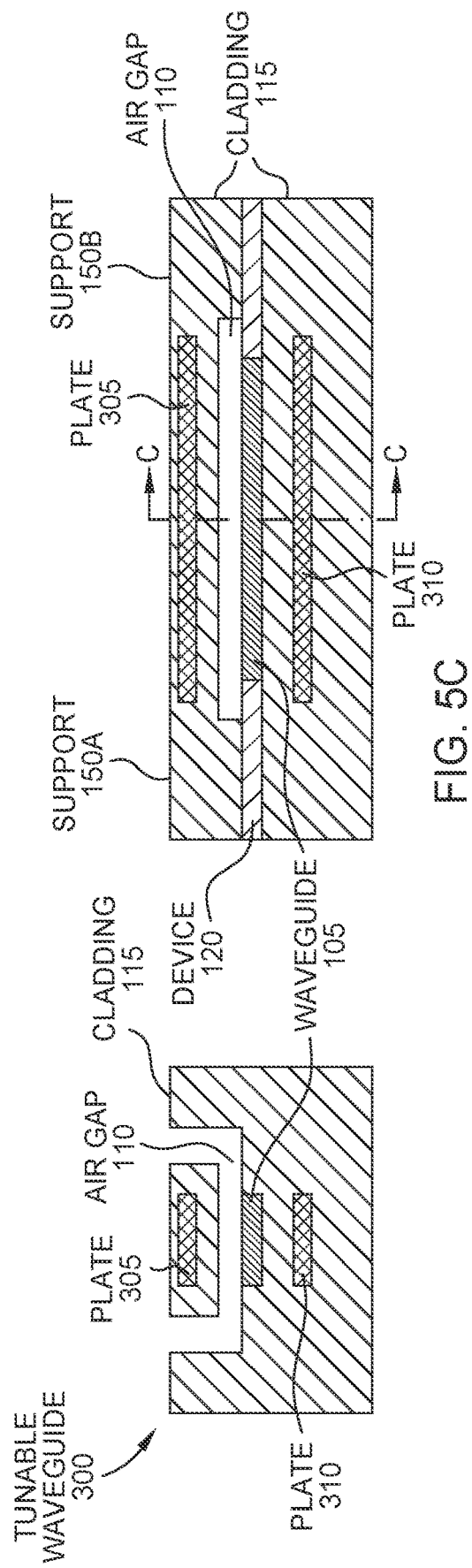

TUNABLE SILICON NITRIDE WAVEGUIDE STRUCTURE

TECHNICAL FIELD

Embodiments presented in this disclosure generally relate to tunable waveguides. More specifically, embodiments disclosed herein relate to using an actuator to change an air gap proximate to a waveguide.

BACKGROUND

Many interferometric optical devices rely on tuning a waveguide by changing its wavelength. Typically, a waveguide is tuned by injecting charge carriers (as is the case with modulators) or using heat. While silicon waveguides can be tuned using heat, other types of waveguides such a silicon nitride or silicon oxy-nitride are athermal—e.g., are generally not tunable using heat. For example, the wavelength of an optical signal in a silicon waveguide can change by 0.07 nm per degree C., while a silicon nitride only changes by 0.01 nm per degree C. Further, a silicon waveguide can change by approximately 100 nm for every Watt of power while a silicon nitride waveguide can change by only 14 nm for every Watt of power. As such, heat is a poor means for tuning silicon nitride waveguides. However, many manufactures of interferometric optical devices prefer silicon nitride waveguides because of relaxed fabrication tolerances and a lower optical loss than silicon waveguides.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

FIGS. 5A-5C illustrate fabricating a tunable waveguide, according to several embodiments.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

One embodiment presented in this disclosure is an optical device that includes a cladding material, a waveguide spaced apart from the cladding material by a gap, and an actuator element configured to move the cladding material relative to the waveguide to vary the gap and change an effective refractive index of the waveguide.

Another embodiment presented in this disclosure is a method that includes decreasing, using an actuator element, a thickness a gap proximate to a waveguide to move a cladding material closer to the waveguide and increasing, using the actuator element, the thickness of the gap.

Another embodiment presented in this disclosure is a method that includes providing an actuator element in a relaxed state where a gap separates a waveguide from a cladding material and operating the actuator element in an actuated state which moves the cladding material relative to the waveguide thereby changing a thickness of the gap.

Example Embodiments

Embodiments herein describe using an actuator (e.g., a microelectromechanical system (MEMS) to tune a waveguide. In one embodiment, the tunable waveguide includes an air gap between the waveguide and cladding. The actuator can compress the cladding to shrink this air gap, bringing the cladding closer to the waveguide. Doing so changes the effective refractive index of the waveguide. Changing the effective index changes the interference pattern within an interferometric optical device containing the tunable waveguide. In this manner, the tunable waveguide described herein can be used with athermal waveguide materials (e.g., silicon nitride) to tune these waveguides, but can also be used with waveguide materials that are tunable using heat. While the term "air gap" is used below, the embodiments are not limited to such as can include any gap such as a gap under vacuum, a gap filled with a low-index fluid, or a gap filled with epoxy.

Figure 1A:
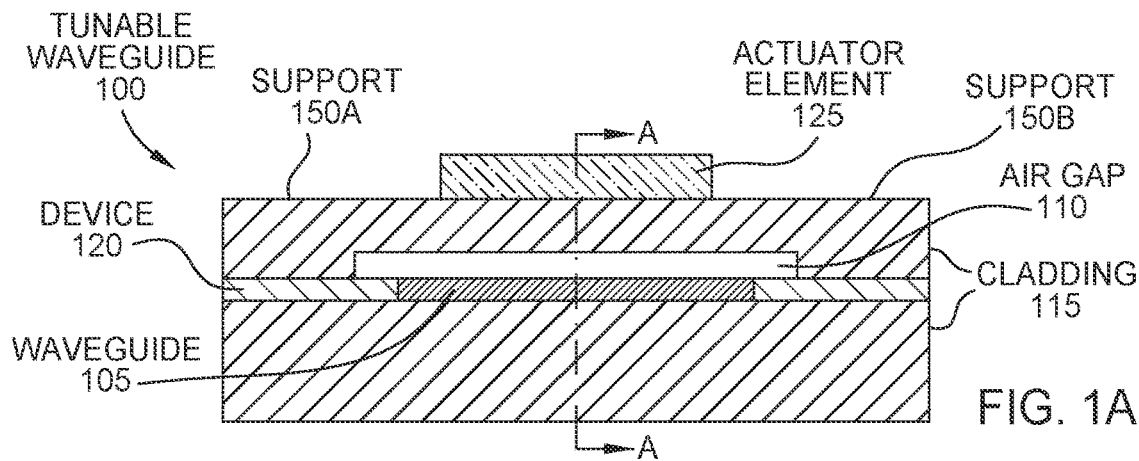
FIGS. 1A and 1B illustrate using an actuator element to tune a waveguide, according to several embodiments.
Figure 1B:
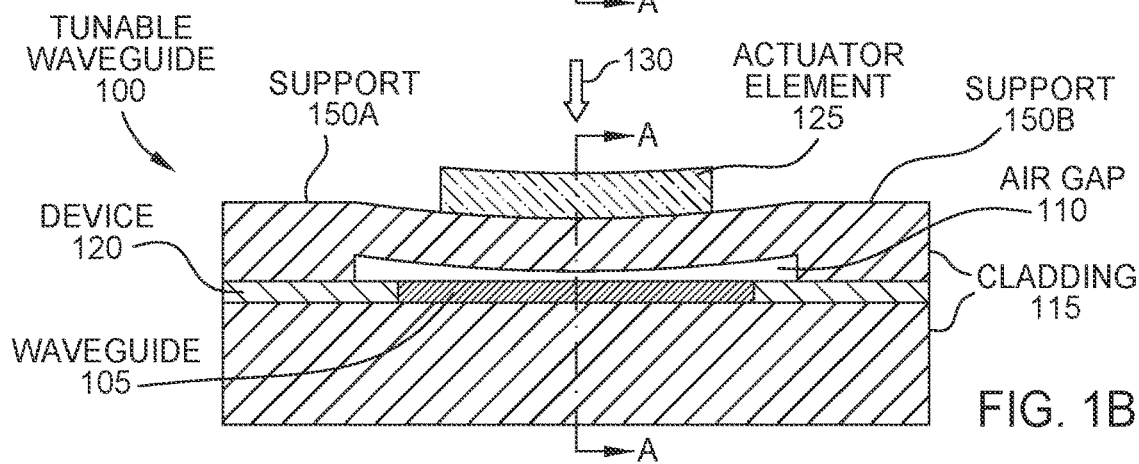

FIGS. 1A and 1B illustrate using an actuator element 125 to tune a waveguide, according to several embodiments. FIG. 1A illustrates a tunable waveguide 100 that includes a waveguide 105 that is part of an optical device 120 (e.g., an interferometric optical device). Some non-limiting examples of optical devices 120 that can include the tunable waveguide 100 are described in FIGS. 7-9.

The waveguide 100 (e.g., a waveguide core) can be made of an athermal waveguide material, such as silicon nitride, or a thermal waveguide material, such as silicon. Some non-limiting examples of suitable waveguide material includes silicon nitride, silicon oxynitride, silicon, III/semiconductor material (e.g., Indium Phosphide (InP)), or Lithium niobate (LiNbO3). In one example, an athermal waveguide material changes less than 0.03 nm per degree C.

The waveguide 100 (or core) is disposed within cladding 115, which can be a dielectric material (e.g., silicon dioxide). However, the tunable waveguide 100 includes an air gap 110 arranged above the waveguide 105 which separates the waveguide 105 from the portion of the cladding 115 disposed above the waveguide 105. That is, the waveguide 105 is space apart from the upper cladding 115 by the air gap 110. In other embodiments, instead of being filled with air, the gap 110 can be under vacuum, filled with a low-index fluid, or filled with epoxy.

In one embodiment, the refractive index of the air gap 110 (~1) is lower than the refractive index of the cladding 115 (~1.5). While much of the mode of the optical signal is confined within the waveguide 105, the mode includes an evanescent field that includes the air gap 110 and the cladding 115. However, as discussed in detail below, the tunable waveguide 100 can shrink the air gap 110 (e.g., reduce the thickness of the air gap 110) by compressing the cladding 115 so that a portion of the air gap 110 is replaced by the cladding 115. This results in more of the evanescent field being contained in the cladding 115 than the air gap 110. Because the cladding 115 can have a much higher refractive index than the air gap 110, the effective refractive index of the optical mode within the waveguide 105 also changes, thereby tuning the waveguide 105. That is, changing the thickness of the air gap 110 changes the wavelength of the optical signal in the waveguide 105 which can change the interference pattern of the optical device 120.

The tunable waveguide 100 includes an actuator element 125 for changing the air gap 110. In one embodiment, the actuator element 125 is part of a MEMS that compresses the cladding 115 to shrink the air gap 110. The actuator element 125 is not limited to any particular type of mechanical motion or a particular means for generating the motion. For example, the actuator element 125 may use an electromagnetic force, spring force, thermal expansion force, and the like to shrink the air gap 110.

FIG. 1B illustrates the result of applying a force (as shown by the arrow 130) to compress a portion of the cladding 115 between the actuator element 125 and the air gap 110 to shrink the air gap 110. In other words, FIG. 1B illustrates the actuator element 125 moving more of the cladding 115 into a region previously occupied by the air gap 110 which then changes the effective refractive index of the waveguide 105.

In one embodiment, the thickness of the air gap 110 is 0.5 microns or less when in the relaxed state illustrated in FIG. 1A. However, when in an activated state as shown in FIG. 1B, the air gap 110 may be shrunk to a thickness that ranges between 40 to 440 nanometers (nm). That is, the actuator element 125 can move the cladding 115 from a relaxed state (where the thickness of the air gap 110 is at a maximum thickness) to be within 40 to 440 nm from the waveguide 105.

FIGS. 1A and 1B also include supports 150A and 150B that are part of the cladding 115 (e.g., made of the same material as the cladding 115) which permit a portion of the cladding 115 to be suspended above the waveguide 105, thereby establishing the air gap 110. That is, the supports 150 are connected to ends of the portion of the cladding 115 above the waveguide 105 so that this portion is suspended above the waveguide 105.

Figure 2A:
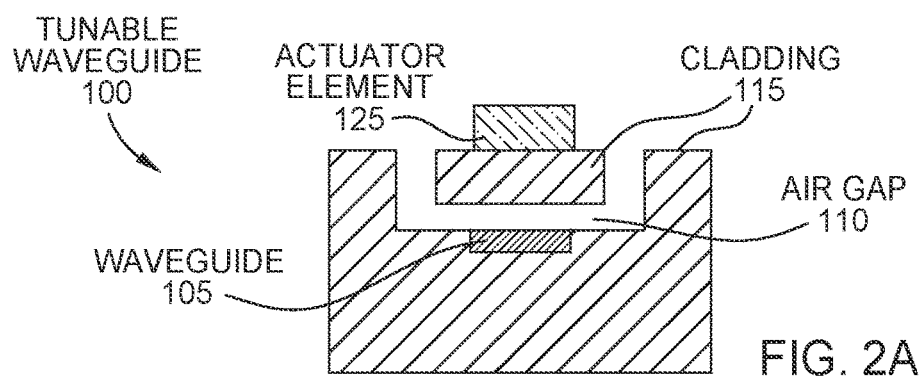
FIGS. 2A and 2B illustrate using an actuator element to tune a waveguide, according to several embodiments.
Figure 2B:
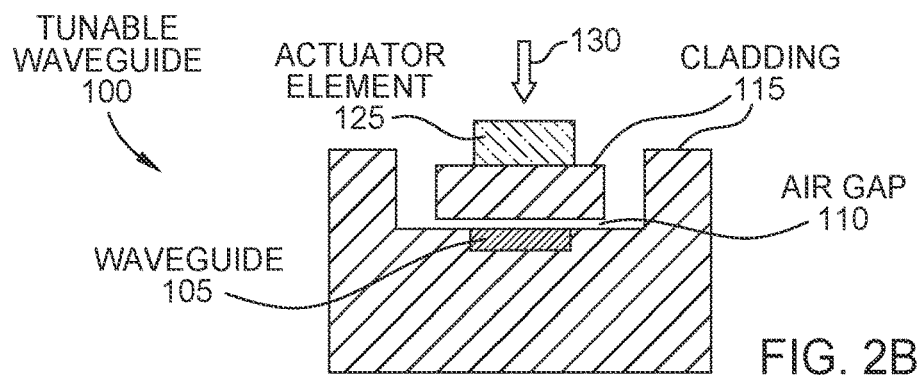

FIGS. 2A and 2B illustrate using the actuator element 125 to tune a waveguide, according to several embodiments. While FIGS. 1A and 1B illustrate a cross section of the tunable waveguide 100 in a first direction (e.g., an X axis), FIGS. 2A and 2B illustrate a cross section of the tunable waveguide 100 in a second, perpendicular direction (e.g., a Y axis). In this example, FIGS. 2A and 2B illustrate a cross section of the tunable waveguide 100 along the A-A cross section shown in FIGS. 1A and 1B.

In the view in FIG. 2A, the air gap 110 has a U-shape where the air gap is disposed around at least three sides of the cladding 115 above the waveguide 105. In this example, the actuator element 125 and the underlying cladding 115 is suspended above the waveguide 105 using the supports 150 in FIGS. 1A and 1B, which are not visible in this view. FIG. 2A corresponds to FIG. 1A where the actuator element 125 is in a relaxed state. In this example, the thickness of the air gap 110 may be a maximum. For example, in the relaxed state, no power may be provided to the actuator element 125, and thus, the element 125 does not apply a compression force that shrinks the air gap 110.

In contrast, FIG. 2B corresponds to FIG. 1B where the actuator element 125 is in an actuated state which applies the force illustrated by the arrow 130 to compress the cladding 115 and shrink the air gap 110. As discussed previously, this moves more of the cladding 115 into the evanescent field of the optical signal which adjusts the effective refractive index of the waveguide 105.

In one embodiment, the tunable waveguide 100 includes a control system for controlling the compression force applied by the actuator element 125. For example, the control system may monitor one or more parameters of the optical signal and then adjust the compression force applied by the actuator element 125 in response. For instance, the control system may monitor the amplitude or phase of the optical signal in the waveguide 105 and then increase or decrease the force applied by the actuator element 125 until reaching a desired amplitude or phase shift of the optical signal. In this manner, the control system can tune the optical signal in the waveguide 105 by controlling the force applied by the actuator element 125.

Figure 3A:
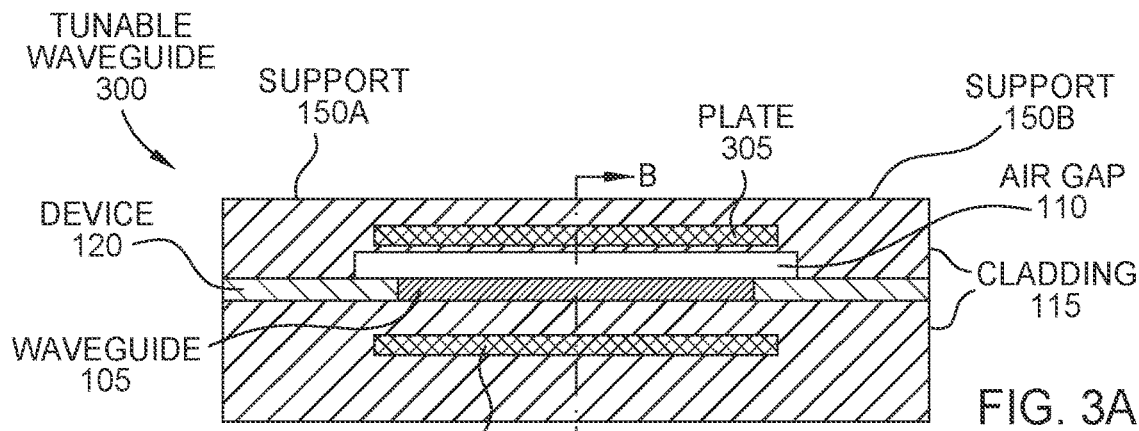
FIGS. 3A and 3B illustrate using a capacitive actuator to tune a waveguide, according to several embodiments.
Figure 3B:
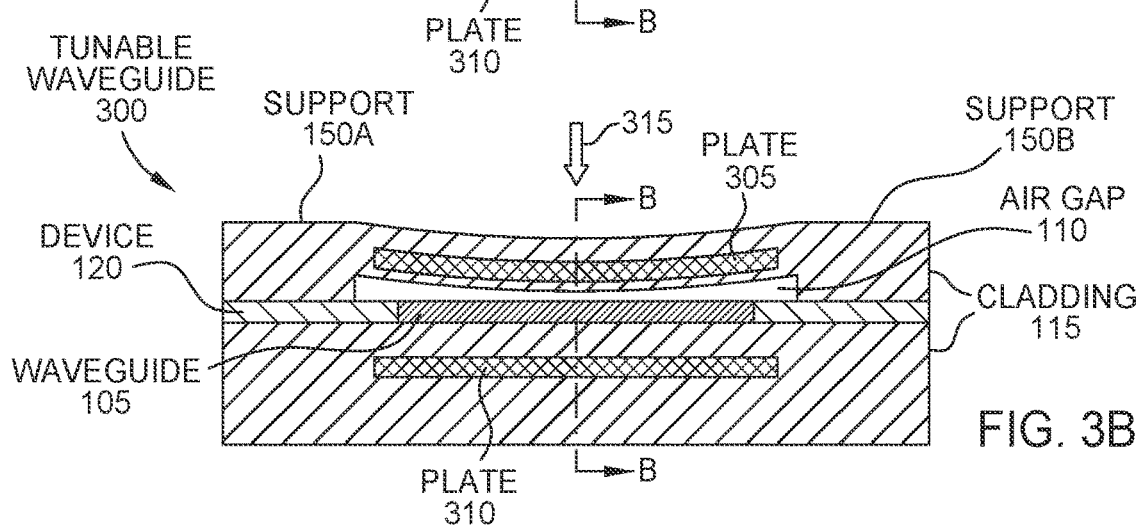

FIGS. 3A and 3B illustrate using a capacitive actuator to tune a waveguide, according to several embodiments. FIG. 3A illustrates a tunable waveguide 300 that includes a first conductive plate 305 and a second conductive plate 310 for shrinking the air gap 110. That is, the first plate 305 and the second plate 310 are example of a first actuator element and a second actuator element that can apply a compression force. In this example, the first conductive plate 305 is disposed on a first side of the air gap 110 while the second conductive plate 310 is disposed on a second, opposite side of the air gap 110.

In one example, a control system applies a voltage difference between the first plate 305 and the second plate 310. The voltage can create an attractive force that pulls the first plate 305 towards the second plate 310. For example, the first plate 305 and the second plate 310 can be part of a capacitive MEMS. The attractive force between the plates 305, 310 can apply a compression force on the portion of the cladding 115 between the air gap 110 and the first plate 305 in order to move the cladding 115 closer to the waveguide 105. This is shown in FIG. 3B where the attractive force between the plates 305, 310 create the compression force as shown by the arrow 315. Because the supports 150A and 150B hold the ends of the cladding 115 above the waveguide in a fixed position, the compression force bends the middle of the cladding 115 above the waveguide 105 into the air gap 110 thereby reducing the thickness of the air gap 110.

However, FIGS. 3A and 3B illustrate just one implementation of actuator elements for shrinking the air gap 110. In another embodiment, a spring force could be used to generate the compression force illustrated by the arrow 315. In yet another embodiment, a thermal expansion force could be used where a thermal expansive material is disposed in the cladding 115 above the air gap 110. As the material expands, it generates the compression force which shrinks the air gap 110. Thus, the embodiments herein are not limited to the capacitive plate structure illustrated in FIGS. 3A and 3B.

Figure 4A:
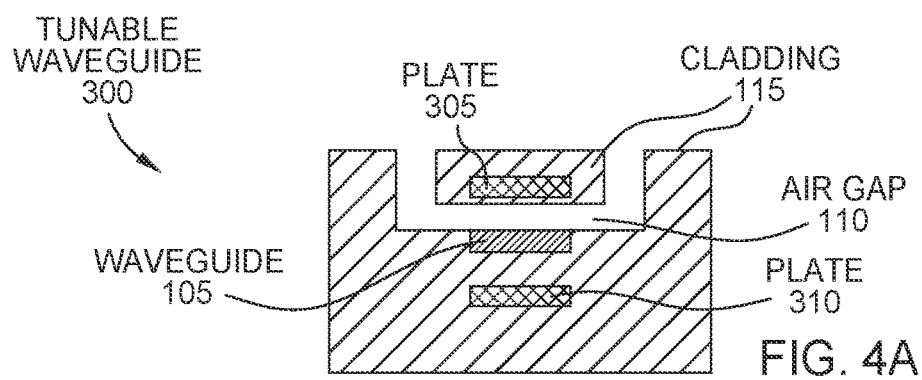
FIGS. 4A and 4B illustrate using a capacitive actuator to tune a waveguide, according to several embodiments.
Figure 4B:
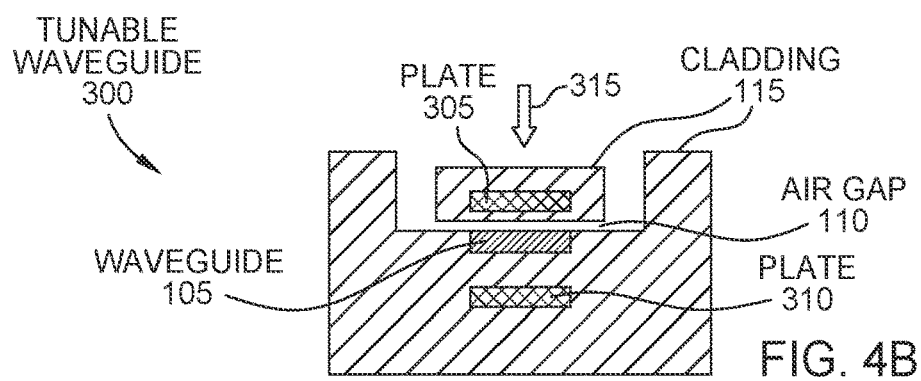

FIGS. 4A and 4B illustrate using a capacitive actuator to tune a waveguide, according to several embodiments. While FIGS. 3A and 3B illustrate a cross section of the tunable waveguide 300 in a first direction (e.g., an X axis), FIGS. 4A and 4B illustrate a cross section of the tunable waveguide 300 in a second, perpendicular direction (e.g., a Y axis). In this example, FIGS. 4A and 4B illustrate a cross section of the tunable waveguide 400 along the B-B cross section shown in FIGS. 3A and 3B.

In the view in FIG. 4A, the air gap 110 has a U-shape. In this example, the first plate 305 and the underlying cladding 115 is suspended above the waveguide 105 using the supports 150 in FIGS. 3A and 3B, which are not visible in this view. FIG. 4A corresponds to FIG. 3A where the first plate 305 and the second plate 310 are in a relaxed state. In this example, the thickness of the air gap 110 may be a maximum—e.g., no power or voltage is applied to the first plate 305 or the second plate 310. Thus, the plates 305, 310 do not apply a compression force that shrinks the air gap 110.

In contrast, FIG. 4B corresponds to FIG. 3B where the first plate 305 and the second plate 310 is in an actuated state which applies the force illustrated by the arrow 315 to compress the cladding 115 and shrink the air gap 110. As discussed previously, this moves more of the cladding 115 into the evanescent field of the optical signal which adjusts the effective refractive index of the mode in the waveguide 105.

In one embodiment, the tunable waveguide 300 includes a control system for controlling the compression force applied by the first plate 305 or the second plate 310. For example, the control system may monitor one or more parameters of the optical signal and then adjust the compression force applied by the first plate 305 or the second plate 310 in response. In this manner, the control system can tune the optical signal in the waveguide 105 by controlling the force applied by the first plate 305 and the second plate 310.

FIGS. 5A-5C illustrate fabricating a tunable waveguide, according to several embodiments. FIG. 5A illustrates a structure that already includes the waveguide 105, the first plate 305 and the second plate 310, which are embedded in the cladding 115. In addition, the structure includes a sacrificial material 405 deposited between the waveguide 105 and the first plate 305.

Moreover, each of the FIGS. 5A-5C illustrates two views of the structure where the right views in FIGS. 5A-5C illustrate a cross section of the structure in a first direction (e.g., an X axis) and the left views in the FIGS. 5A-5C illustrate a cross section of the structure in a second, perpendicular direction (e.g., a Y axis). In this example, the left views illustrate a cross section of the structure along the C-C cross sections illustrated in the right views.

The sacrificial material 405 can be any material that is different from the material of the waveguide 105, the first plate 305, the second plate 310, and the cladding 115. That way, as discussed in FIG. 5C, the sacrificial material 405 can be removed using a wet etch while not affecting the other material in the structure. In one embodiment, the sacrificial material 405 may be silicon while the waveguide 105 is silicon nitride and the cladding 115 is silicon dioxide. The first plate 305 and the second plate 310 can be a metal. However, this is just one example of the materials that can be used.

FIG. 5B illustrates removing a portion of the cladding 115 to expose ends of the sacrificial material 405. In one embodiment, a plasma etch can be used to create the slots 410A and 410B. These slots 410 form the sides of the air gaps shown in FIGS. 2A, 2B, 4A, and 4B.

FIG. 5C illustrates removing the sacrificial material 405 to form the rest of the air gap 110. In one embodiment, a wet etch can be used to selectively etch the sacrificial material 405 without affecting the other material in the tunable waveguide. Also, one advantage of using a wet etch is that alignment is not required to remove the sacrificial material 405.

As shown, the portion of the air gap 110 between the first plate 305 and the waveguide 105 is defined by the thickness of the sacrificial material 405. Thus, the thickness of the air gap 110 can be tightly controlled by controlling the formation of the sacrificial material 405.

The FIGS. 5A-5C illustrate one method for fabricating the tunable waveguide 300 illustrated in FIGS. 3A-4B. However, FIGS. 5A-5C are just one example of forming the tunable waveguide.

Figure 6:
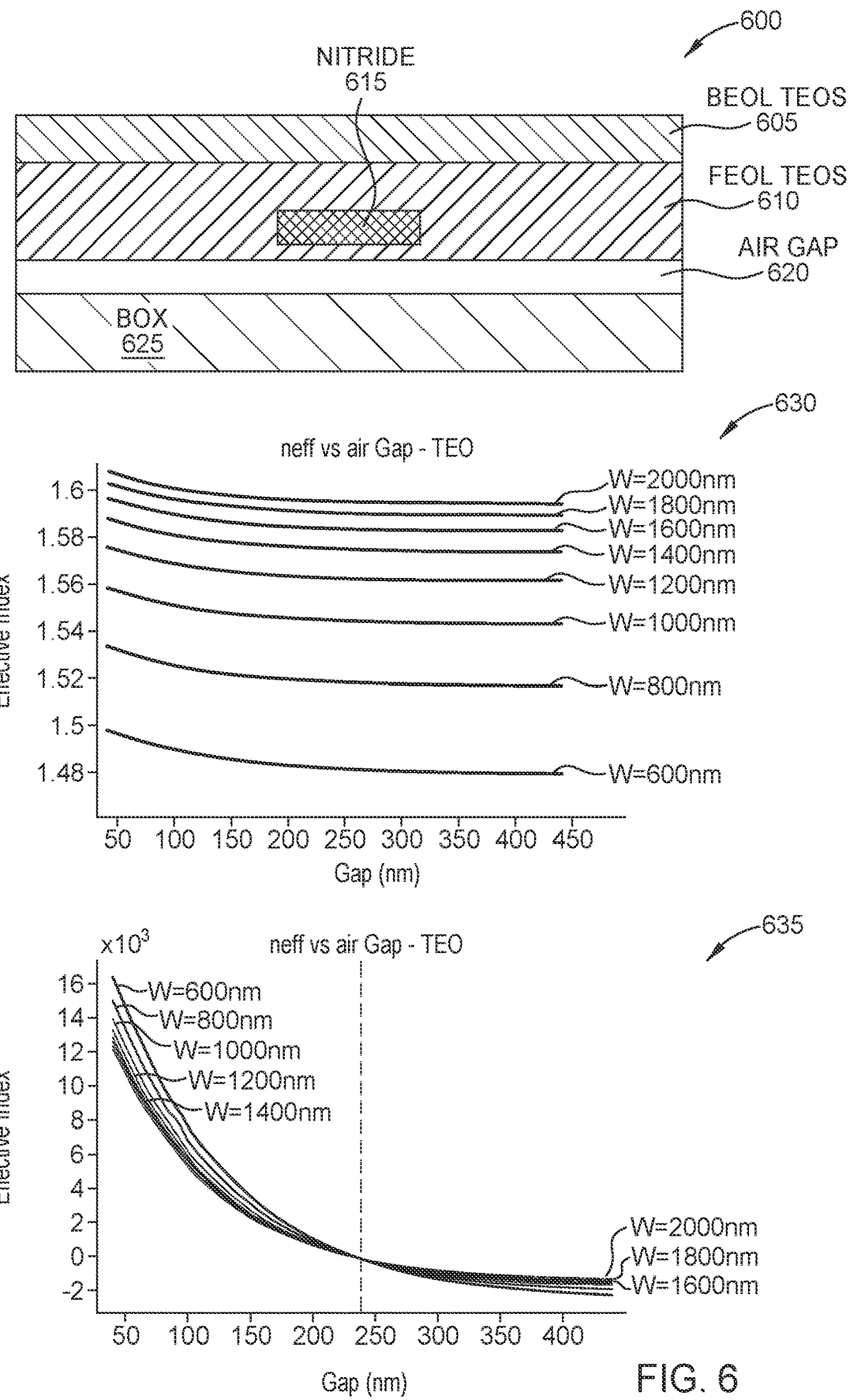
FIG. 6 illustrates simulation results of changing an air gap to tune a waveguide, according to several embodiments.

FIG. 6 illustrates simulation results of changing an air gap to tune a waveguide, according to several embodiments. FIG. 6 includes a simulated structure 600 that includes a back-end of the line (BEOL) Tetraethyl orthosilicate (TEOS) 605 (a Silicon Dioxide plasma deposition technique that uses TEOS as a precursor), a front-end of the line (FEOL) TEOS 610, an air gap 620, and a buried oxide (BOX) 625. Moreover, a silicon nitride waveguide 615 is disposed in the FEOL TEOS 610.

During the simulation, the thickness of the air gap 620 is adjusted, which moves the BOX 625 (e.g., a cladding material) closer to the silicon nitride waveguide 615. In this simulation, the thickness of the air gap 620 was varied from 40 nm to 440 nm. In addition, the width of the nitride waveguide 615 was varied in parallel.

The charts 630 and 635 illustrate the results of the simulation. Chart 630 illustrates the change of the effective index of the waveguide 615 (Y axis) for different widths of the waveguide 615 (60 nm-2000 nm) as the thickness of the air gap 620 varies (X axis). Thus, the chart 630 illustrates, for a particular width of the waveguide 615, a change in the effective index as the gap 620 is adjusted.

The chart 635 illustrates the change in the effective index (Y axis) as the thickness of the air gap 620 varies (X axis). That is, the chart 635 illustrates the difference in the effective refractive index (Dneff) for waveguides of different widths as the gap thickness varies. The charts 630 and 635 illustrate that the same changes in refractive index that can be achieved in silicon waveguides using heat or injected charge carries can also be achieved in an athermal silicon nitride waveguide 615 by varying the air gap 620 using the techniques described herein.

Figure 7:
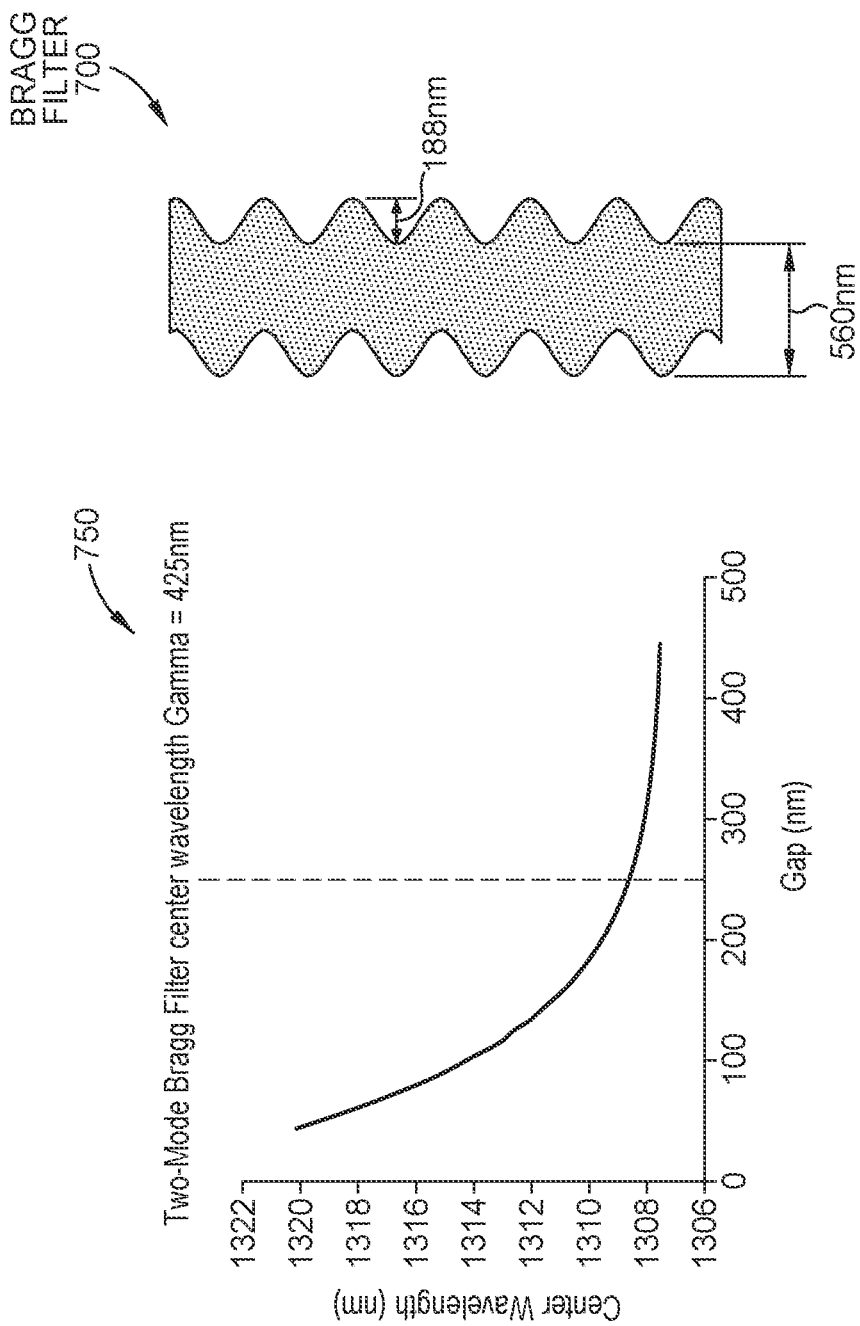
FIG. 7 illustrates a Bragg filter with an actuated tunable waveguide, according to one embodiment.

FIG. 7 illustrates a Bragg filter 700 with an actuated tunable waveguide, according to one embodiment. That is, the Bragg filter 700 is one example of an optical device that can include a tunable waveguide discussed in the previous figures. Specifically, FIG. 7 illustrates a two-mode Bragg filter 700 where an optical signal propagates along the longitudinal length of the filter 700. However, a tunable waveguide can also be used in a single mode Bragg filter.

A center wavelength of the Bragg filter 700 is established by the period of the grating and the effective index of a TD0 mode and a TD1 mode. When an adjustable air gap is disposed above or below the Bragg filter 700, then a control system can tune the effective index of the Bragg filter 700 which changes the wavelength. That is, the air gap can be shrunk to change the effective index of the Bragg filter 700, which is a waveguide.

The chart 750 illustrates how adjusting an air gap near the Bragg filter 700 (which brings a cladding material closer to the filter 700) changes the center wavelength of an optical signal propagating through the Bragg filter 700. In this example, a 1308 optical signal can be tuned to a 1320 nm optical signal by shrinking the air gap.

Figure 8:
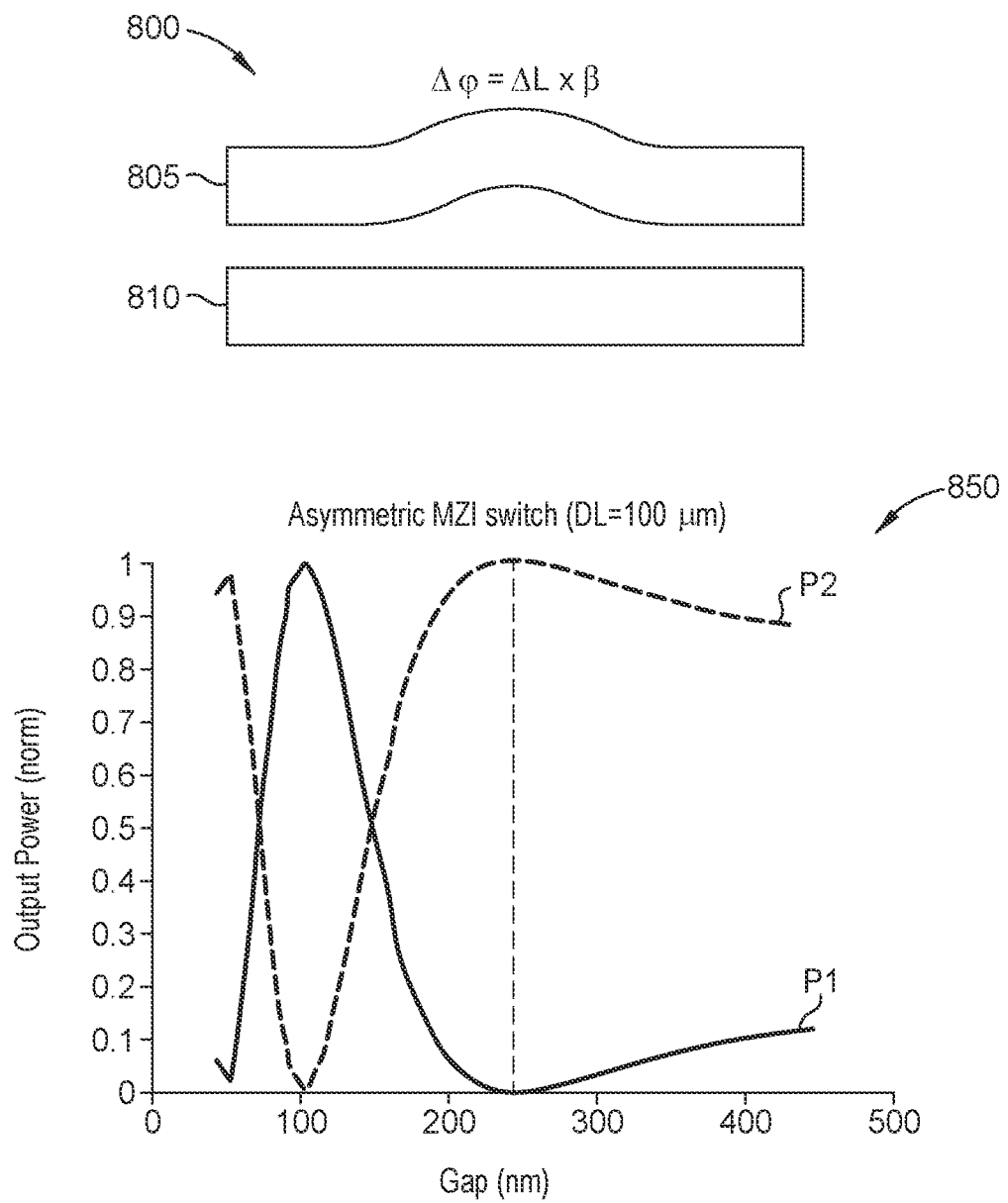
FIG. 8 illustrates a directional coupler with an actuated tunable waveguide, according to one embodiment.

FIG. 8 illustrates a directional coupler 800 with an actuated tunable waveguide, according to one embodiment. That is, the directional coupler 800 is one example of an optical device that can include a tunable waveguide discussed in the previous figures.

The directional coupler 800 uses the phase relationship between the two adjacent waveguides 805 and 810 to split off a designed optical power. An adjustable air gap can be disposed near one of the waveguides 805 to 810 change the local index of the directional coupler 800 which allows for tuning of a split ratio between the two waveguides 805 and 810.

The chart 850 illustrates the power corresponding to the waveguides 805 and 810. That is, P1 and P2 represent the power output of the bottom waveguide 810 and top waveguide 805. If an optical signal was input to only one waveguide, e.g., the waveguide 810, then the output switches between the bottom waveguide output (P1 equals the output of the waveguide 810) and the top waveguide output (P2 equals the output of the waveguide 805).

Tuning the air-gap of the delta-L waveguide changes its refractive index, thus changing the phase of the optical wave passing through it, and this changes the resonant condition of the two waves when the reach the directional coupler before the output.

Figure 9:
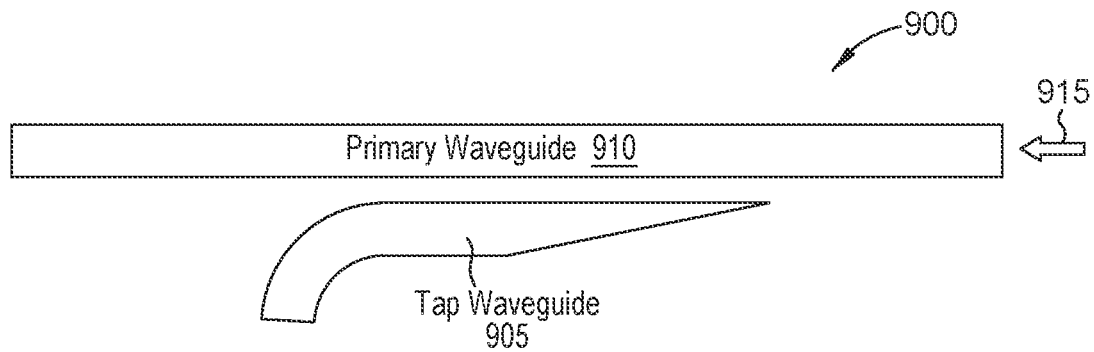
FIG. 9 illustrates a tap coupler with an actuated tunable waveguide, according to one embodiment.

FIG. 9 illustrates a tap coupler 900 with an actuated tunable waveguide, according to one embodiment. The tap coupler 900 is another example of an optical device that can include a tunable waveguide discussed in the previous figures.

The adjacent tap waveguide 905 couples some light off a primary waveguide 910 as the light propagates in the primary waveguide 910 as shown by the arrow 915. The amount of coupling is based on the distance between the waveguides 905, 910 and the confinement of the optical field.

In one embodiment, an adjustable air gap can control the confinement of the optical field in the primary waveguide 910. For example, when the actuator element (or elements) controlling the air gap are in the relaxed state (e.g., the air gap has the greatest thickness), the light is more tightly confined in the primary waveguide 910, and thus, the optical coupling to the tap waveguide 905 is reduced. In contrast, when in the activated state where the actuator element shrinks the air gap, the light is less well confined in the primary waveguide 910. As a result, more optical coupling occurs between the primary waveguide 910 and the tap waveguide 905.

Figure 10:
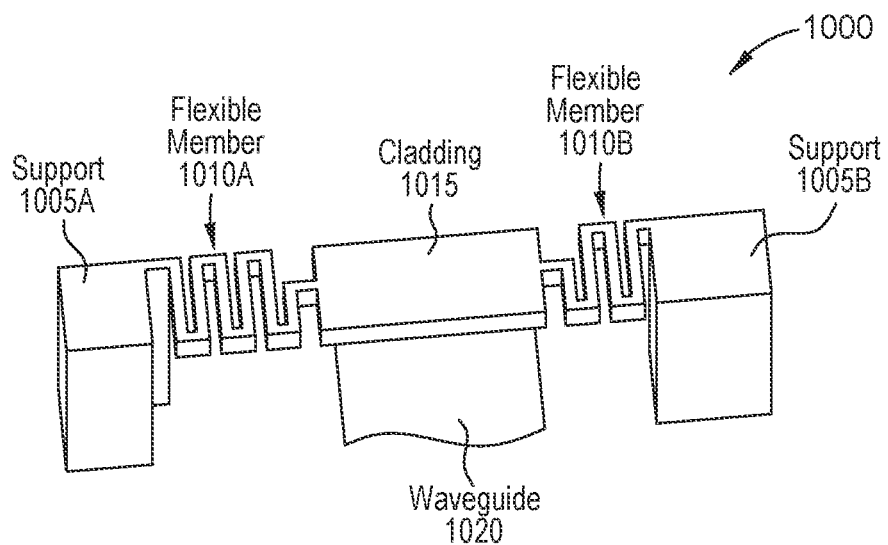
FIG. 10 illustrates a tunable waveguide, according to one embodiment.

FIG. 10 illustrates a tunable waveguide 1000, according to one embodiment. FIG. 10 is a plan view of the waveguide 1000, which includes supports 1005A and 1005B which suspend flexible members 1010A and 1010B and cladding 1015 above a waveguide 1020. Specifically, FIG. 10 illustrates a relaxed state where an air gap between the cladding 1015 and the waveguide 1020 is the largest.

Although not shown, the tunable waveguide 1000 can include one or more actuator elements to urge the cladding 1015 closer to the waveguide 1020 when in an activated state. For example, a first plate may be disposed on top of the cladding 1015 while a second plate is disposed below the waveguide 1020. As discussed in FIGS. 3A-4B, a voltage difference between the plates can be used to urge the cladding 1015 closer to the waveguide during an activated state, thereby changing the effective index of the waveguide 1020. In one embodiment, a voltage of 1V or less can be used to urge the cladding 1015 to the waveguide 1020. In one embodiment, the tunable waveguide 1000 can achieve a 0.5 micron displacement of the cladding 1015.

Further, the flexible members 1010A and 1010B provide compliance (or elasticity) for the cladding 1015 to be moved closer to the waveguide 1020. For example, the flexible members 1010A and 1010B may stretch when in the activated state so that the cladding 1015 can more easily move in a direction towards to the waveguide, relative to if the cladding 1015 was coupled to the supports 1005 using solid members which are less flexible.

Figure 11:
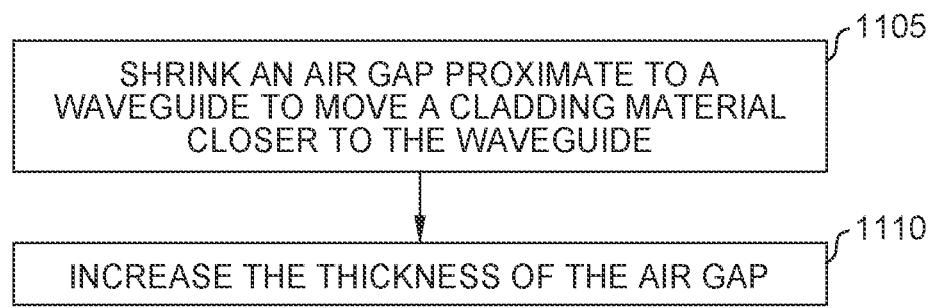
FIG. 11 illustrates a flowchart for changing an effective index of a waveguide using an air gap, according to one embodiment.

FIG. 11 illustrates a flowchart of a method for changing an effective index of a waveguide using an air gap, according to one embodiment. At block 1105, an actuator element decreases a thickness of an air gap proximate to the waveguide. In one embodiment, the actuator element replaces the air gap with a cladding material (e.g., a dielectric). For example, the actuator element may urge the cladding material into the air gap which adjusts the effective index of the waveguide. In one embodiment, the air gap is in an evanescent field of an optical signal propagating the waveguide. Thus, when in the activated state, the cladding material is moved so that a greater portion of the cladding material is in the evanescent field of the optical signal.

In one embodiment, the air gap is between the waveguide and the cladding material. Further, the cladding material may be disposed between the air gap and an actuator element. For example, the actuator element may apply a compression force on the cladding material that urges the cladding into the air gap, thereby reducing the thickness of the air gap.

In one embodiment, a control system controls the amount of force applied by the actuator element. The control system may decrease or increase the force to achieve a desired effective index change in the waveguide. For example, the control system may include a feedback loop for measuring one or more parameters to determine a current effective index of the waveguide and then adjust the force applied by the actuator element to change the current effective index to a value closer to a desired value of the refractive index. In this manner, the control system can adjust the force applied by the actuator element to tune the effective index of the waveguide.

At block 1110, the actuator element increases the thickness of the air gap. For example, the actuator element may switch from an actuated state at block 1105 to a relaxed state at block 1110. For instance, the tunable waveguide may switch between the actuated state at block 1105 and the relaxed state at block 1110, where the actuator element does not apply any force. That is, at block 1105, a control system operates the actuator element in the actuated state which moves the cladding material closer to the waveguide thereby shrinking the air gap. At block 1110, the control system operates the actuator element in the relaxed state.

In another embodiment, blocks 1105 and 1110 are used to switch between two actuated states with two different effective indexes. This can be achieved by the actuator element applying two different forces at blocks 1105 and 1110 which then result in the air gap changing thicknesses. Using two different air gap thicknesses can be used to, e.g., establish two different interference patterns. Nonetheless, in this example, the method changes between two actuated states, rather than changing between an actuated and a relaxed state.

Like block 1105, a control system increase the thickness of the air gap using a feedback loop. The control system can be entirely hardware (e.g., using a look up table) to adjust the force applied by the actuator element, or the control system can include software or firmware elements for controlling the actuator element.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," or "at least one of A or B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. An optical device, comprising:
a cladding material;
a waveguide spaced apart from the cladding material by a gap; and
a capacitive actuator comprising a first conductive plate embedded in the cladding material and a second conductive plate embedded in the cladding material, the second conductive plate positioned relative to the first conductive plate such that the gap is positioned between the first conductive plate and the second conductive plate, the capacitive actuator configured to move the cladding material relative to the waveguide to vary the gap and change an effective refractive index of the waveguide.

2. The optical device of claim 1, wherein the gap is disposed around at least three sides of the cladding material.

3. The optical device of claim 1, wherein the cladding material is connected to supports at respective ends.

4. The optical device of claim 1, wherein the capacitive actuator is configured to operate in a relaxed state where no force is applied by the capacitive actuator and the gap is at a maximum thickness, and an activated state where the capacitive actuator shrinks the gap to less than the maximum thickness.

5. The optical device of claim 4, wherein the capacitive actuator is configured to move the cladding material closer to the waveguide when a voltage difference is applied to the first and second conductive plates.

6. The optical device of claim 5, wherein the capacitive actuator operates in the relaxed state when no voltage is applied to the first and second conductive plates and in the activated state when the voltage difference is applied to the first and second conductive plates.

7. The optical device of claim 5, wherein the waveguide is between the gap and the second conductive plate.

8. The optical device of claim 1, wherein the waveguide comprises an athermal waveguide material.

9. The optical device of claim 1, wherein the gap is less than 0.5 microns and the capacitive actuator is configured to shrink the gap by a range between 40 to 440 nm.

10. A method for adjusting a thickness of a gap defined between a cladding material and a waveguide, the method comprising:
adjusting, using a capacitive actuator comprising a first conductive plate embedded in the cladding material and a second conductive plate embedded in the cladding material and positioned relative to the first conductive plate such that the gap defined between the waveguide and the cladding material is positioned between the first conductive plate and the second conductive plate, the thickness of the gap proximate to the waveguide to move the cladding material closer to the waveguide.

11. The method of claim 10, wherein the cladding material has a different refractive index than the gap, wherein moving the cladding material closer to the waveguide changes an effective refractive index of the waveguide.

12. The method of claim 10, wherein the gap is disposed around at least three sides of the cladding material.

13. The method of claim 10, wherein the cladding material is connected to supports at respective ends.

14. The method of claim 10, wherein the adjusting comprises:
activating the capacitive actuator to decrease the thickness of the gap to less than a maximum thickness; and
deactivating the capacitive actuator to increase the thickness of the gap to the maximum thickness.

15. The method of claim 10, wherein the adjusting comprises:
operating the capacitive actuator in a first activated state to decrease the thickness of the gap to a first thickness; and
operating the capacitive actuator in a second activated state to increase the thickness of the gap to a second thickness that is thicker than the first thickness and thinner than a maximum thickness of the gap.

16. A method comprising:
providing a capacitive actuator in a relaxed state in which a gap separating a waveguide from a cladding material has a maximum thickness, the capacitive actuator comprising a first conductive plate embedded in the cladding material and a second conductive plate embedded in the cladding material and positioned relative to the first conductive plate such that the gap is positioned between the first conductive plate and the second conductive plate; and
operating the capacitive actuator in an actuated state to move the cladding material closer to the waveguide to decrease a thickness of the gap.

17. The method of claim 16, wherein the cladding material has a different refractive index than the gap, wherein moving the cladding material closer to the waveguide changes an effective refractive index of the waveguide.

18. The method of claim 16, wherein the gap is disposed around at least three sides of the cladding material.

19. The method of claim 16, wherein the cladding material is connected to supports at respective ends.

20. The method of claim 16, wherein operating the capacitive actuator in the actuated state comprises applying a voltage to create a voltage difference between the first conductive plate and the second conductive plate.

* * * * *